US012136396B2

(12) United States Patent
Tian et al.

(10) Patent No.: US 12,136,396 B2
(45) Date of Patent: Nov. 5, 2024

(54) DISPLAY PANEL AND DISPLAY DEVICE

(71) Applicant: Wuhan China Star Optoelectronics Technology Co., Ltd., Wuhan (CN)

(72) Inventors: Chao Tian, Wuhan (CN); Yanqing Guan, Wuhan (CN); Guanghui Liu, Wuhan (CN); Fei Ai, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/430,058

(22) PCT Filed: Jun. 8, 2021

(86) PCT No.: PCT/CN2021/098763
§ 371 (c)(1),
(2) Date: Aug. 11, 2021

(87) PCT Pub. No.: WO2022/246909
PCT Pub. Date: Dec. 1, 2022

(65) Prior Publication Data

US 2024/0038130 A1 Feb. 1, 2024

(30) Foreign Application Priority Data

May 28, 2021 (CN) ......................... 202110591188.1

(51) Int. Cl.
*G09G 3/3266* (2016.01)
*G09G 3/20* (2006.01)
*G09G 3/36* (2006.01)

(52) U.S. Cl.
CPC ......... *G09G 3/3266* (2013.01); *G09G 3/2092* (2013.01); *G09G 3/3677* (2013.01);
(Continued)

(58) Field of Classification Search
CPC .. G09G 3/2092; G09G 3/3677; G09G 3/3266; G09G 2300/0408;
(Continued)

(56) References Cited

U.S. PATENT DOCUMENTS

2013/0278572 A1* 10/2013 Lee ...................... H03K 17/687 345/204
2013/0286316 A1* 10/2013 Lee ..................... G02F 1/13306 349/46

(Continued)

FOREIGN PATENT DOCUMENTS

CN 101539698 A 9/2009
CN 103412427 A 11/2013

(Continued)

*Primary Examiner* — Xuemei Zheng
(74) *Attorney, Agent, or Firm* — Menachem Nathan; Nathan & Associates

(57) ABSTRACT

The present application provides a display panel and a display device. An N-th auxiliary unit is arranged in a display area of the display panel. An output end of the N-th auxiliary unit is connected to an N-th scan line. By connecting the auxiliary unit arranged in the display area to the corresponding scan line, a falling edge of a scan signal transmitted in the scan line can have sharp falling or a rising edge of the scan signal can have sharp rising, which can alleviate a signal distortion problem caused by transmission delay in the display area.

10 Claims, 7 Drawing Sheets

(52) U.S. Cl.
CPC ................. *G09G 2300/043* (2013.01); *G09G 2310/0267* (2013.01)

(58) Field of Classification Search
CPC ..... G09G 2300/0426; G09G 2300/043; G09G 2310/0267; G09G 2310/06; G09G 2310/0202; G09G 3/3674; G02F 1/136286; G02F 1/13624; G02F 1/13454; G02F 1/1368
See application file for complete search history.

(56) References Cited

U.S. PATENT DOCUMENTS

| | | | | |
|---|---|---|---|---|
| 2016/0005357 | A1* | 1/2016 | Cho | G09G 3/3677 345/78 |
| 2018/0299720 | A1* | 10/2018 | Hao | G02F 1/1368 |

FOREIGN PATENT DOCUMENTS

| | | | | |
|---|---|---|---|---|
| CN | 106486048 | A | * | 3/2017 |
| CN | 110068970 | A | | 7/2019 |
| JP | 2007034000 | A | | 2/2007 |

* cited by examiner

DISPLAY PANEL AND DISPLAY DEVICE

FIELD OF DISCLOSURE

The present application relates to a field of display technology and in particular, to a display panel and a display device.

DESCRIPTION OF RELATED ART

As a display part of electronic apparatuses, display devices have been extensively used in various electronic products. Various driving modules are important components in the display devices. The driving modules are mostly located in a peripheral area of the display devices, and driving signals need to be transmitted through a driving signal line to a display area of the display device.

At present, with continuous development of display applications, appearances and sizes of display panels are also continuously improving, and there are diversified requirements for the display panels in order to satisfy more and more usage scenarios. However, as the sizes of the display panels continue to increase, transmission delay of the driving signals is also getting longer, and distortion of the driving signals is becoming more and more serious, making it difficult to ensure display quality.

SUMMARY

The present application provides a display panel and a display device to alleviate a scan signal distortion problem caused by transmission delay in a display area.

In a first aspect, the present application provides a display panel, comprising:

- a first line;
- an N-th scan line, wherein at least a portion of the N-th scan line is arranged in a display area of the display panel, and is configured to transmit an N-th level scan signal, wherein N is a positive integer; and
- an N-th auxiliary unit, wherein the N-th auxiliary unit is arranged in the display area of the display panel, an output end of the N-th auxiliary unit is electrically connected to the N-th scan line, an input end of the N-th auxiliary unit is electrically connected to the first line, a control end of the N-th auxiliary unit is electrically connected to an (N+M)-th scan line, and M is a positive integer.

In some embodiments, the N-th auxiliary unit comprises a plurality of thin film transistors (TFTs), one of a source or a drain of at least one of the TFTs is electrically connected to the N-th scan line, the other one of the source or the drain of the at least one TFT is electrically connected to the first line, and a gate of the at least one TFT is electrically connected to the (N+M)-th scan line.

In some embodiments, the N-th scan line is electrically connected to one of the source or the drain of each TFT to form a plurality of corresponding connection nodes on the N-th scan line; the N-th level scan signal is input from at least one end of the N-th scan line; and if the N-th level scan signal is input from one end of the N-th scan line, a density of the connection nodes close to another end of the N-th scan line is greater than a density of the connection nodes close to the one end of the N-th scan line from which the N-th level scan signal is input.

In some embodiments, if the N-th level scan signal is input from two ends of the N-th scan line, a density of the connection nodes in a middle of the N-th scan line is greater than a density of the connection nodes close to any end of the N-th scan line.

In some embodiments, if the TFTs are N-channel TFTs, the first line is configured to transmit a constant low-potential signal.

In some embodiments, if the TFTs are N-channel TFTs, the first line is configured to transmit a low-potential signal when the TFTs are turned on.

In some embodiments, if the control end of the N-th auxiliary unit is electrically connected to an (N+1)-th scan line, the first line is an (N+X)-th scan line, and X is an integer greater than or equal to 2; and if the control end of the N-th auxiliary unit is connected to an (N+2)-th scan line, the first line is an (N+Y)-th scan line, and Y is equal to 1, or Y is an integer equal to or greater than 3.

In some embodiments, if the TFTs are P-channel TFTs, the first line is configured to transmit a constant high-potential signal.

In some embodiments, if the TFTs are P-channel TFTs, the first line is configured to transmit a high-potential signal when the TFTs are turned on.

In some embodiments, if the control end of the N-th auxiliary unit is electrically connected to an (N+1)-th scan line, the first line is an (N+X)-th scan line, and X is an integer greater than or equal to 2; and if the control end of the N-th auxiliary unit is connected to an (N+2)-th scan line, the first line is an (N+Y)-th scan line, and Y is equal to 1, or Y is an integer equal to or greater than 3.

In a second aspect, the present application provides a display device, comprising the display panel of any embodiment mentioned above.

Advantages of the Present Application

The present application provides a display panel and a display device. By connecting the auxiliary unit located in the display area to the corresponding scan line, a falling edge of the scan signal transmitted in the scan line can have sharp falling (be quickly pulled down) or a rising edge of the scan signal can have sharp rising (be quickly pulled up). Accordingly, the present application can alleviate a scan signal distortion problem caused by transmission delay in the display area.

BRIEF DESCRIPTION OF DRAWINGS

In order to explain the technical solutions of the present invention more clearly, drawings which will be described in the embodiments are briefly introduced hereinafter. Obviously, the accompanying drawings described below are only some embodiments of the present invention. Persons of ordinary skills in the art are able to obtain other drawings based on these drawings.

DETAILED DESCRIPTION OF EMBODIMENTS

Figure 1:
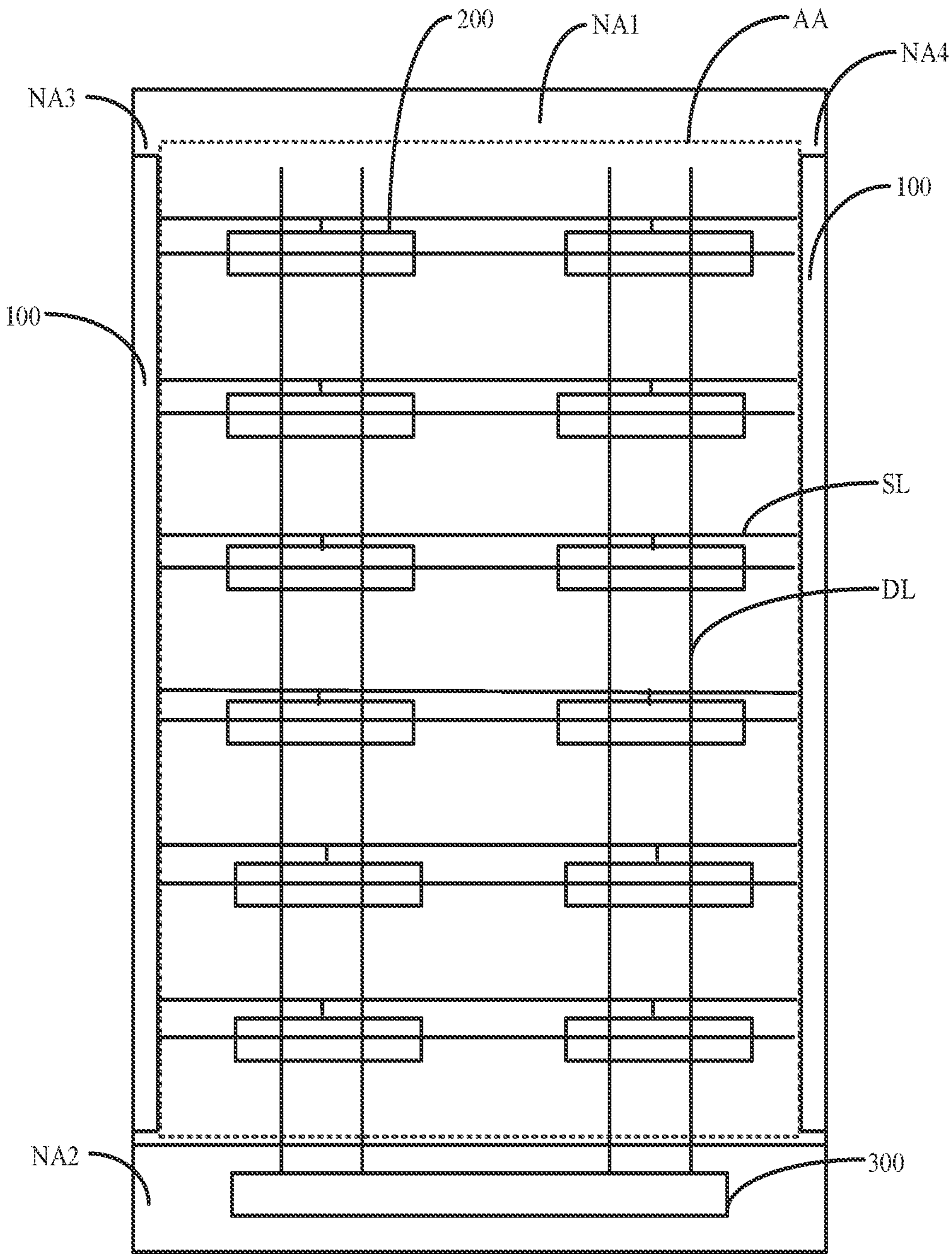
FIG. 1 is a first structural diagram illustrating a display panel according to one embodiment of the present application.

In order to make the purpose, technical solutions, and effects of the preset application clearer and more definite, a description is provided below with reference to the accompanying drawings and in conjunction with specific embodiments. It should be understood that the specific embodiments described here are only used for illustrative purposes, and are not used to limit the present application.

Please refer to FIGS. 1-7. The present embodiment provides a display panel, which comprises a first line DDL, an N-th scan line, and an auxiliary unit 210. At least a portion of the N-th scan line is arranged in a display area AA of the display panel to transmit an N-th level scan signal, and N is a positive integer. The N-th auxiliary unit 210 is located in the display area AA of the display panel, and an output end of the N-th auxiliary unit 210 is electrically connected to the N-th scan line, an input end of the N-th auxiliary unit 210 is electrically connected to the first line DDL, a control end of the N-th auxiliary unit 210 is electrically connected to an (N+M)-th scan line, and M is a positive integer.

It can be understood that, in the display panel of the present application, by connecting each auxiliary unit located in the display area AA to the corresponding scan line, a falling edge of a scan signal transmitted in the scan line can have sharp falling (be quickly pulled down) or a rising edge of the scan signal transmitted in the scan line can have sharp rising (be quickly pulled up), which can alleviate a scan signal distortion problem resulting from transmission delay in the display area AA.

When M is equal to 1, the (N+M)-th scan line can be the (N+1)-th scan line. When M is equal to 2, the (N+M)-th scan line can be the (N+2)-th scan line.

In some embodiments, the N-th auxiliary unit 210 comprises a plurality of thin film transistors (TFTs), one of a source or a drain of at least one of the TFTs is electrically connected to the N-th scan line, the other one of the source or the drain of the at least one TFT is electrically connected to the first line DDL, and a gate of the at least one TFT is electrically connected to the (N+1)-th scan line or the (N+2)-th scan line.

In some embodiments, the N-th scan line is connected to the source or the drain of each of the TFTs to form a plurality of corresponding connection nodes on the N-th scan line. The N-th level scan signal inputs from at least one end of the N-th scan line. If the N-th level scan signal is input from one end of the N-th scan line, a density of the connection nodes close to another end of the N-th scan line is greater than a density of the connection nodes close to the one end of the N-th scan line from which the N-th level scan signal is input.

In some embodiments, if the N-th level scan signal is input from two ends of the N-th scan line, a density of the connection nodes in a middle of the N-th scan line is greater than a density of the connection nodes close to any end of the N-th scan line.

It should be noted that the farther the scan signal is transmitted in the corresponding scan line, the more serious transmission delay of the scan signal. Therefore, in the present embodiment, more TFTs are arranged at a terminal end of the scan line for scan signal transmission to enhance falling (pull-down) of the scan signal in a terminal end area, so as to further improve sharp falling of the falling edge of the scan signal.

It should be noted that the display panel can further comprise a driving module 100, and the driving module 100 can be a GOA circuit or a gate driving circuit. If the N-th level scan signal is input from one end of the N-th scan line, the driving module 100 is located at one side of the display area AA. If the N-th level scan signal is input from two ends of the N-th scan line, one driving module 100 is located at one side of the display area AA, and at the same time, another driving module 100 is located at another side of the display area AA.

In some embodiments, if the TFTs are N-channel TFTs, the first line DDL is configured to transmit a constant low-potential signal.

It can be understood that, in the present embodiment, a constant low-potential signal can be used to pull down the falling edge of the scan signal. Because the constant low-potential signal is used, a low potential can be maintained constantly, the falling edge of the scan signal can achieve falling better.

In some embodiments, if the TFTs are N-channel TFTs, the first line DDL is used to transmit a low-potential signal when the TFTs are turned on.

It can be understood that, in the present embodiment, the first line DDL can also be used to transmit a pulse signal. When the N-channel TFTs are turned on, the pulse signal is in a low potential state. Similarly, the falling edge of the scan signal can achieve falling better.

In some embodiments, if the control end of the N-th auxiliary unit 210 is electrically connected to an (N+1)-th scan line, the first line DDL is an (N+X)-th scan line, and X is greater than or equal to 2. If the control end of the N-th auxiliary unit 210 is connected to an (N+2)-th scan line, the first line DDL is an (N+Y)-th scan line, and Y is equal to 1, or Y is an integer equal to or greater than 3.

In some embodiments, at least a portion of the first line DDL is located in the display area AA.

In some embodiments, if the TFTs are P-channel TFTs, the first line DDL is used to transmit a constant high-potential signal.

It can be understood that, in the present embodiment, the constant high-potential signal can be used to better achieve rising of the rising edge of the scan signal. Because the constant high-potential signal is used, a high potential can be maintained constantly, and therefore, the rising edge of the scan signal can achieve better rising (sharp rising).

In some embodiments, if the TFTs are P-channel TFTs, the first line DDL is used to transmit a high-potential signal when the TFTs are turned on.

It can be understood that, in the present embodiment, the first line DDL can also be used to transmit a pulse signal. When the P-channel TFTs are turned on, the pulse signal is in a high potential state. Similarly, the present application can better achieve rising of the rising edge of the scan signal.

In some embodiments, the present application provides a display device, which comprises the display panel in any of the above embodiments.

It can be understood that in the display device of the present embodiment, the falling edge of the scan signal transmitted in the scan line can have sharp falling (be pulled down quickly) or the rising edge of the scan signal can have sharp rising (be pulled up quickly) by connecting the auxiliary unit located in the display area AA to the corresponding scan line. Accordingly, the present application alleviates the scan signal distortion problem caused by the transmission delay in the display area AA.

As shown in FIG. 1, the present embodiment provides a display panel. The display panel further comprises a driving module 100, a plurality of driving lines SL, and an auxiliary module 200. The driving module 100 is located in a non-display area of the display panel, and the driving module 100 comprises a plurality of cascaded driving units, wherein an N-th level driving unit 110 is used to output an N-th level driving signal G (N); the driving lines SL are located in the display area AA of the display panel, and the N-th driving line is connected to an output end of the N-th level driving unit 110; the auxiliary module 200 is located in the display area AA, and the auxiliary module 200 comprises a plurality of auxiliary units. An output end of the N-th auxiliary unit 210 is connected to the N-th driving line to better achieve falling (pull-down) of a falling edge of N-th level driving signal G (N) or better achieve rising (pull-up) of a rising edge of the N-th level driving signal G (N).

It can be understood that in the display panel of the present embodiment, by connecting the auxiliary module 200 located in the display area AA to the corresponding driving line SL, a falling edge of a driving signal transmitted in the driving line SL can have sharp falling (be quickly pulled down) or a rising edge of a driving signal can have sharp rising (be quickly pulled up), which can alleviate the driving signal distortion problem when the driving module 100 in the non-display area transmits the driving signal to the display area AA.

It should be noted that in the display panel, the non-display area is located around the display area AA. The non-display area can comprise a first non-display sub-area NA1, a second non-display sub-area NA2, a third non-display sub-area NA3, and a fourth non-display sub-area NA4. In a front view, the first non-display sub-area NA1 can be located on an upper side of the display area AA, the second non-display sub-area NA2 can be located on a lower side of the display area AA, the third non-display sub-area NA3 can be located on a left side of the display area AA, and the fourth non-display sub-area NA4 can be located on a right side of the display area AA.

The display panel can further comprise a source driver 300 and a plurality of data lines DL, and the source driver 300 is electrically connected to the data lines DL. The source driver 300 is located in the second non-display sub-area NA2, and the data line DL can extend from the second non-display sub-area NA2 to the display area AA. The source driver 300 can be a source driver integrated circuit for outputting corresponding data signals.

The display panel can comprise one or more driving modules 100. When the display panel comprises only one driving module 100, the driving module 100 can be located in the third non-display sub-area NA3 or the fourth non-display sub-area NA4. When the display panel comprises two driving modules 100, one of the driving modules 100 can be located in one of the third non-display sub-area NA3 or the fourth non-display sub-area NA4, and the other driving module 100 can be located in the other one of the third non-display sub-area NA3 or the fourth non-display sub-area NA4.

In one embodiment, one driving line SL can be electrically connected to one or more driving units. For example, one driving line SL can be electrically connected to two driving units, and the two driving units can be two driving units in different driving modules.

In one embodiment, one driving unit can be electrically connected to one or more driving lines SL. For example, one driving unit can be, but is not limited to, electrically connected to two driving lines SL, and one driving unit can also be electrically connected to four driving lines SL. Correspondingly, the driving unit can be one driving unit in the driving module 100, and one driving line SL can be one scan line.

It can be understood that the cascaded driving units can output the driving signals with the same frequency and different phases. For example, the falling edge of the N-th level driving signal G (N) is synchronized with a rising edge of an (N+1)-th level driving signal G (N+1), or the rising edge of the (N+1)-th level driving signal G (N+1) slightly lags behind the falling edge of the N-th level driving signal G (N), wherein N can be a positive integer. Alternatively, the rising edge of the N-th level driving signal G (N) is synchronized with a falling edge of the (N+1)-th level driving signal G (N+1), or the falling edge of the (N+1)-th level driving signal G (N+1) slightly lags behind the rising edge of the N-th driving signal G (N), wherein N can be a positive integer.

In one embodiment, the driving module 100 can be, but not limited to, a gate driver on array (GOA), row scanning technology integrated on an array substrate) circuit. Correspondingly, the driving unit can be a GOA unit, the driving line SL can be the scan lines, and the driving signal can be the scan signals and configured to control whether to write the data signal.

In one embodiment, the driving module 100 can also be a lighting control circuit. Correspondingly, the driving unit can be a lighting control unit, the driving line SL can be a lighting control signal line, and the driving signal can be a lighting control signal for controlling whether a lighting device emits light or not.

Figure 2:
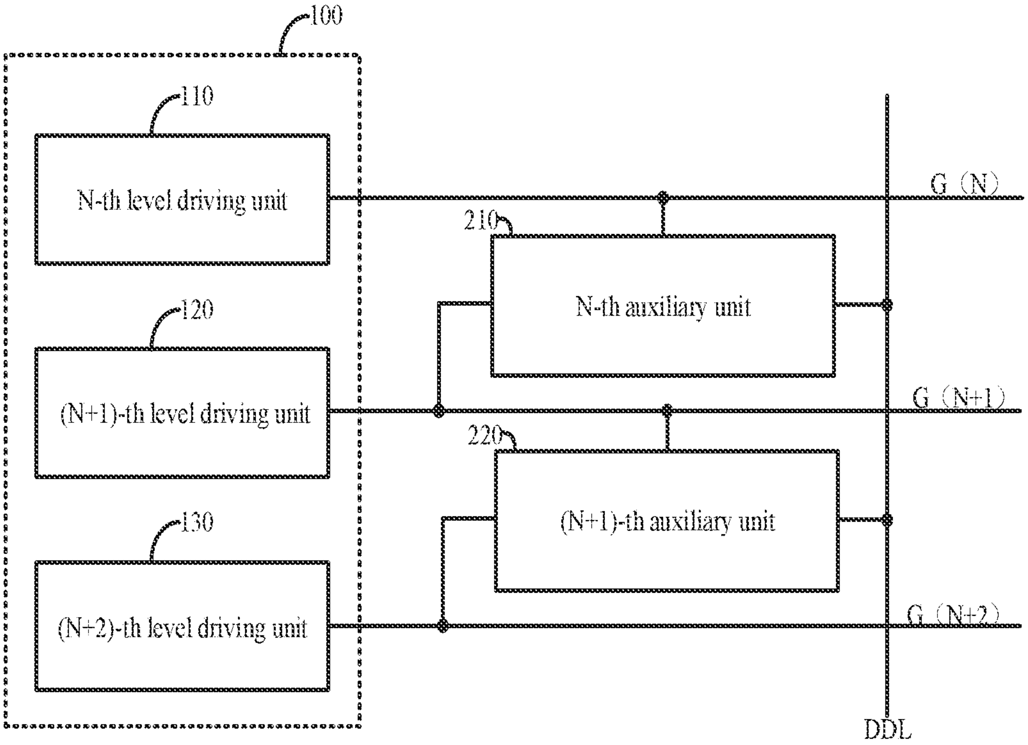
FIG. 2 is a second structural diagram illustrating the display panel according to one embodiment of the present application.

As shown in FIG. 2, in one embodiment, a driving module 100 can comprise an N-th level driving unit 110, an (N+1)-th level driving unit 120, and an (N+2)-th level driving unit 130. The N-th level driving unit 110 is configured to output an N-th level driving signal G (N), an output end of the N-th level driving unit 110 is connected to an N-th driving line, the (N+1)-th level driving unit 120 is configured to output an (N+1)-th level driving signal G (N+1), an output end of the (N+1)-th level driving unit 120 is connected to an (N+1)-th driving line, the (N+2)-th level driving unit 130 is configured to output an (N+2)-th level driving signal G (N+2), and an output end of the (N+2)-th level driving unit 130 is connected to an (N+2)-th driving line.

An output end of an N-th auxiliary unit 210 is electrically connected to the N-th driving line. An output end of an (N+1)-th auxiliary unit 220 is electrically connected to the (N+1)-th driving line.

A control end of the N-th auxiliary unit 210 is connected to the (N+1)-th driving line. A falling edge of the N-th level driving signal G (N) is at a same time as a rising edge of the (N+1)-th level driving signal G (N+1); or alternatively, the rising edge of the (N+1)-th level driving signal G (N+1) lags behind the falling edge of the N-th level driving signal G (N). A control end of the (N+1)-th auxiliary unit 220 is connected to the (N+2)-th driving line. A falling edge of the (N+1)-th level driving signal G (N+1) is at a same time as a rising edge of the (N+2)-th level driving signal G (N+2); or alternatively, the rising edge of the (N+2)-th level driving signal G (N+2) lags behind the falling edge of the (N+1)-th level driving signal G (N+1).

The display panel can further comprise a first line DDL, and the first line DDL is connected to an input end of the N-th auxiliary unit 210 and/or an input end of the (N+1)-th auxiliary unit 220. It can be understood that the first line DDL can transmit a low-potential signal, and the low-potential signal has at least a partial low-potential state.

Figure 3:
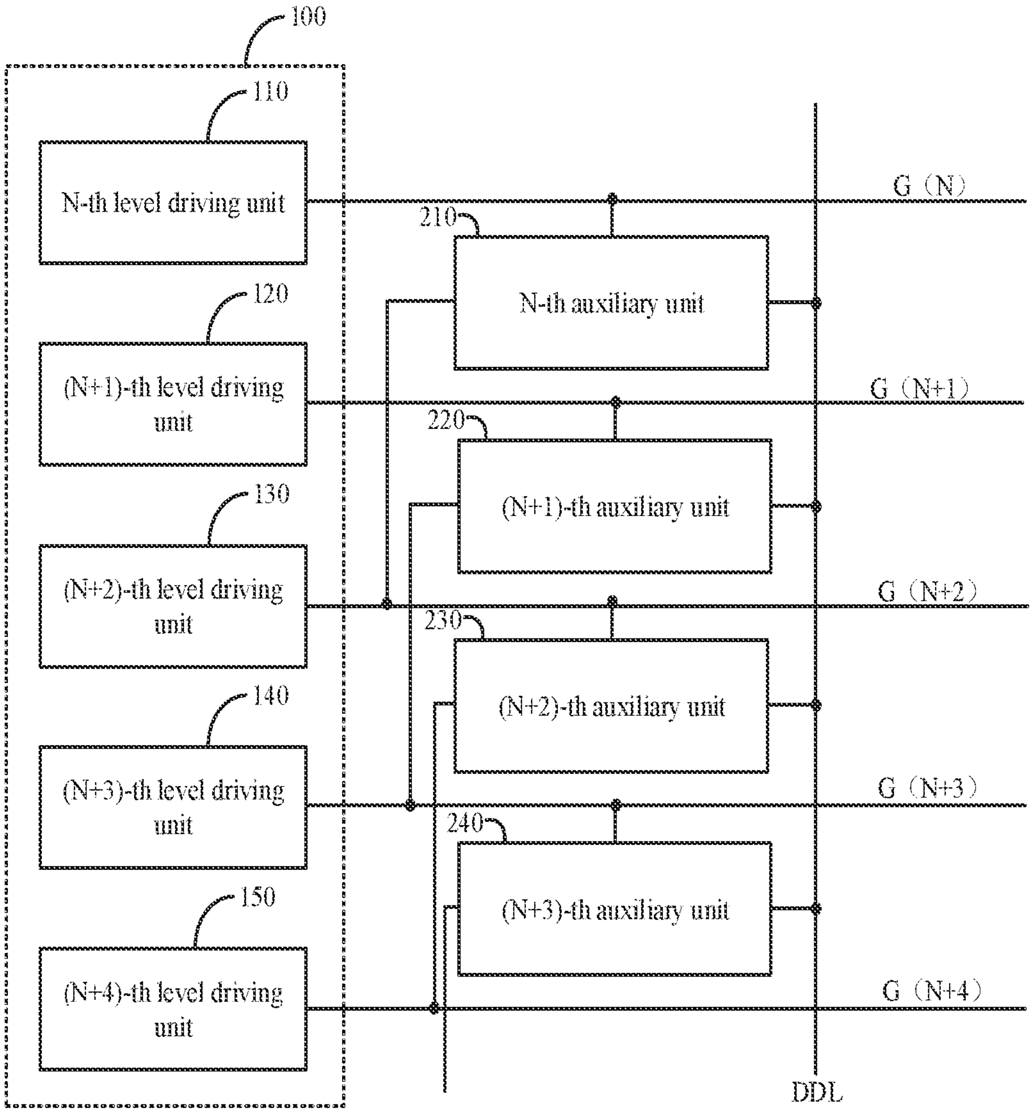
FIG. 3 is a third structural diagram illustrating the display panel according to one embodiment of the present application.

As shown in FIG. 3, in one embodiment, a driving module 100 can comprise an N-th level driving unit 110, an (N+1)-th level driving unit 120, an (N+2)-th level driving unit 130, an (N+3)-th level driving unit 140, and an (N+4)-th level driving unit 150. The N-th level driving unit 110 is configured to output an N-th level driving signal G (N), and an output end of the N-th level driving unit 110 is connected to an N-th driving line. The (N+1)-th level driving unit 120 is configured to output an (N+1)-th level driving signal G (N+1), and an output end of the (N+1)-th level driving unit 120 is connected to an (N+1)-th driving line. The (N+2)-th level driving unit 130 is configured to output an (N+2)-th level driving signal G (N+2), and an output end of the (N+2)-th level driving unit 130 is connected to an (N+2)-th driving line. The (N+3)-th level driving unit 140 is configured to output an (N+3)-th level driving signal G (N+3), and an output end of the (N+3)-th level driving unit 140 is connected to an (N+3)-th driving line. The (N+4)-th level driving unit 150 is configured to output an (N+4)-th level driving signal G (N+4), and an output end of the (N+4)-th level driving unit 150 is connected to an (N+4)-th driving line.

An output end of an N-th auxiliary unit 210 is electrically connected to the N-th driving line. An output end of an (N+1)-th auxiliary unit 220 is electrically connected to the (N+1)-th driving line. An output end of an (N+2)-th auxiliary unit 230 is electrically connected to the (N+2)-th driving line. An output end of an (N+3)-th auxiliary unit 240 is electrically connected to the (N+3)-th driving line.

A control end of the N-th auxiliary unit 210 is connected to the (N+2)-th driving line. A falling edge of the N-th level driving signal G (N) is at a same time as a rising edge of the (N+2)-th level driving signal G (N+2); or alternatively, the rising edge of the (N+2)-th level drive signal G (N+2) lags behind the falling edge of the N-th level drive signal G (N). A control end of the (N+1)-th auxiliary unit 220 is connected to the (N+3)-th driving line. A falling edge of the (N+1)-th level driving signal G (N+1) is at a same time as a rising edge of the (N+3)-th level driving signal G (N+3); or alternatively, the rising edge of the (N+3)-th level driving signal G (N+3) lags behind the falling edge of the (N+1)-th level driving signal G (N+1). A control end of the (N+2)-th auxiliary unit 230 is connected to the (N+4)-th driving line. A falling edge of the (N+2)-th level driving signal G (N+2) is at a same time as a rising edge of the (N+4)-th level driving signal G (N+4); or alternatively, the rising edge of the (N+4)-th level driving signal G (N+4) lags behind the falling edge of the (N+2)-th level driving signal G (N+2). A control end of the (N+3)-th auxiliary unit 240 is connected to an (N+5)-th driving line. A falling edge of the (N+3)-th level driving signal G (N+3) is at a same time as a rising edge of an (N+5)-th level driving signal; or alternatively, the rising edge of the (N+5)-th level driving signal lags behind the falling edge of the (N+3)-th level driving signal G (N+3). A first line DDL is connected to an input end of the N-th auxiliary unit 210, an input end of the (N+1)-th auxiliary unit 220, an input end of the (N+2)-th auxiliary unit 230, and an input end of the (N+3)-th auxiliary unit 240. The first line DDL can transmit a low-potential signal, and the low-potential signal has at least a partial low-potential state.

Figure 4:
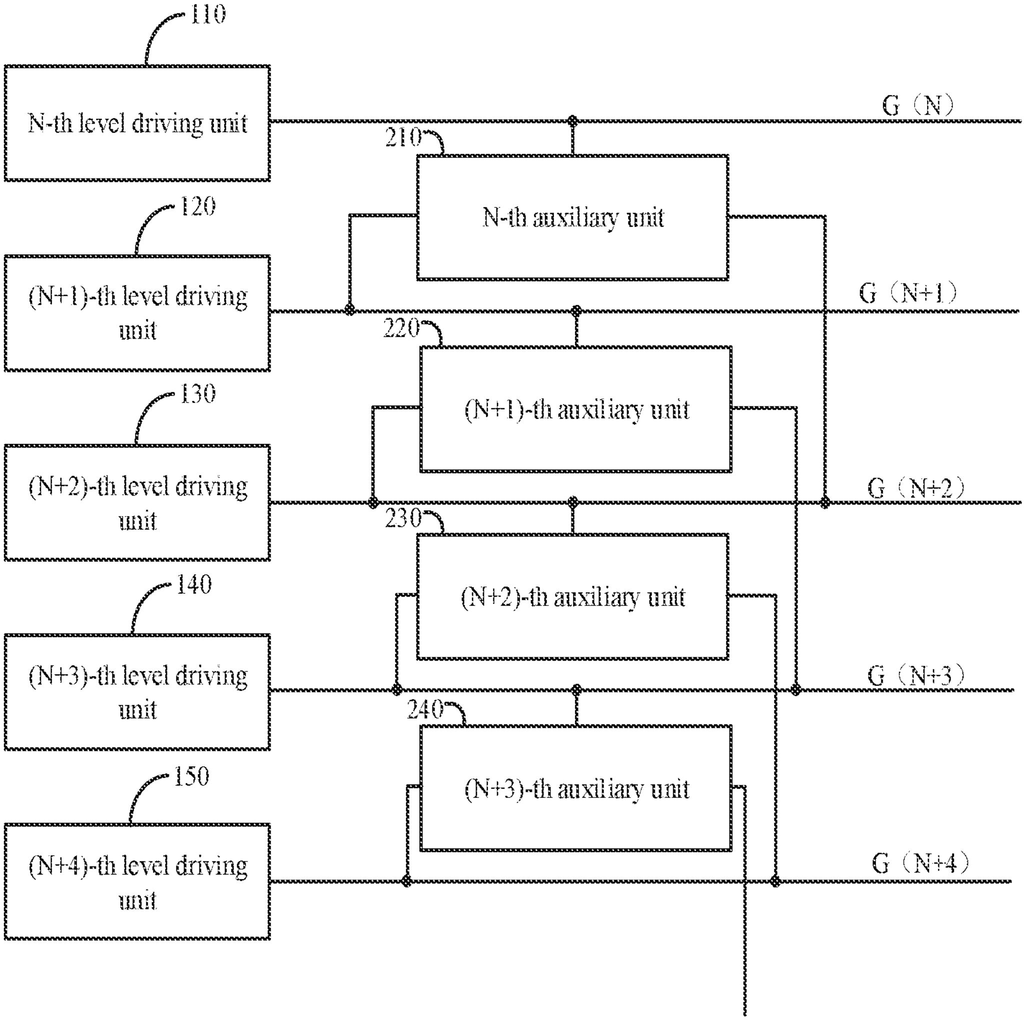
FIG. 4 is a fourth structural diagram illustrating the display panel according to one embodiment of the present application.

As shown in FIG. 4, in one embodiment, a driving module 100 can comprise an N-th level driving unit 110, an (N+1)-th level driving unit 120, an (N+2)-th level driving unit 130, an (N+3)-th level driving unit 140, and an (N+4)-th level driving unit 150. The N-th level driving unit 110 is configured to output an N-th level driving signal G (N), and an output end of the N-th level driving unit 110 is connected to an N-th driving line. The (N+1)-th level driving unit 120 is configured to output an (N+1)-th level driving signal G (N+1), and an output end of the (N+1)-th level driving unit 120 is connected to an (N+1)-th driving line. The (N+2)-th level driving unit 130 is configured to output an (N+2)-th level driving signal G (N+2), and an output end of the (N+2)-th level driving unit 130 is connected to an (N+2)-th driving line. The (N+3)-th level driving unit 140 is configured to output an (N+3)-th level driving signal G (N+3), and an output end of the (N+3)-th level driving unit 140 is connected to an (N+3)-th driving line. The (N+4)-th level driving unit 150 is configured to output an (N+4)-th level driving signal G (N+4), and an output end of the (N+4)-th level driving unit 150 is connected to an (N+4)-th driving line.

An output end of an N-th auxiliary unit 210 is electrically connected to an N-th driving line. An output end of an (N+1)-th auxiliary unit 220 is electrically connected to an (N+1)-th driving line. An output end of an (N+2)-th auxiliary unit 230 is electrically connected to an (N+2)-th driving line. An output end of an (N+3)-th auxiliary unit 240 is electrically connected to an (N+3)-th driving line.

A control end of the N-th auxiliary unit 210 is connected to the (N+1)-th driving line. A falling edge of the N-th level driving signal G (N) is at a same time as a rising edge of the (N+1)-th level driving signal G (N+1); or alternatively, the rising edge of the (N+1)-th level driving signal G (N+1) lags behind the falling edge of the N-th level driving signal G (N). A control end of the (N+1)-th auxiliary unit 220 is connected to the (N+2)-th driving line. A falling edge of the (N+1)-th level driving signal G (N+1) is at a same time as a rising edge of the (N+2)-th level driving signal G (N+2); or alternatively, the rising edge of the (N+2)-th level driving signal G (N+2) lags behind the falling edge of the (N+1)-th level driving signal G (N+1). A control end of the (N+2)-th auxiliary unit 230 is connected to the (N+3)-th driving line. A falling edge of the (N+2)-th level driving signal G (N+2) is at a same time as a rising edge of the (N+3)-th level driving signal G (N+3); or alternatively, the rising edge of the (N+3)-th level driving signal G (N+3) lags behind the falling edge of the (N+2)-th level driving signal G (N+2). A control end of the (N+3)-th auxiliary unit 240 is connected to the (N+4)-th driving line. A falling edge of the (N+3)-th level driving signal G (N+3) is at a same time as a rising edge of the (N+4)-th level driving signal G (N+4); or alternatively, the rising edge of the (N+4)-th level driving signal G (N+4) lags behind the falling edge of the (N+3)-th level driving signal G (N+3).

An input end of the N-th auxiliary unit 210 is connected to the (N+2)-th driving line. An input end of the (N+1)-th auxiliary unit 220 is connected to the (N+3)-th driving line. An input end of the (N+2)-th auxiliary unit 230 is connected to the (N+4)-th driving line. An input end of the (N+3)-th auxiliary unit 240 is connected to an (N+5)-th driving line.

Figure 5:
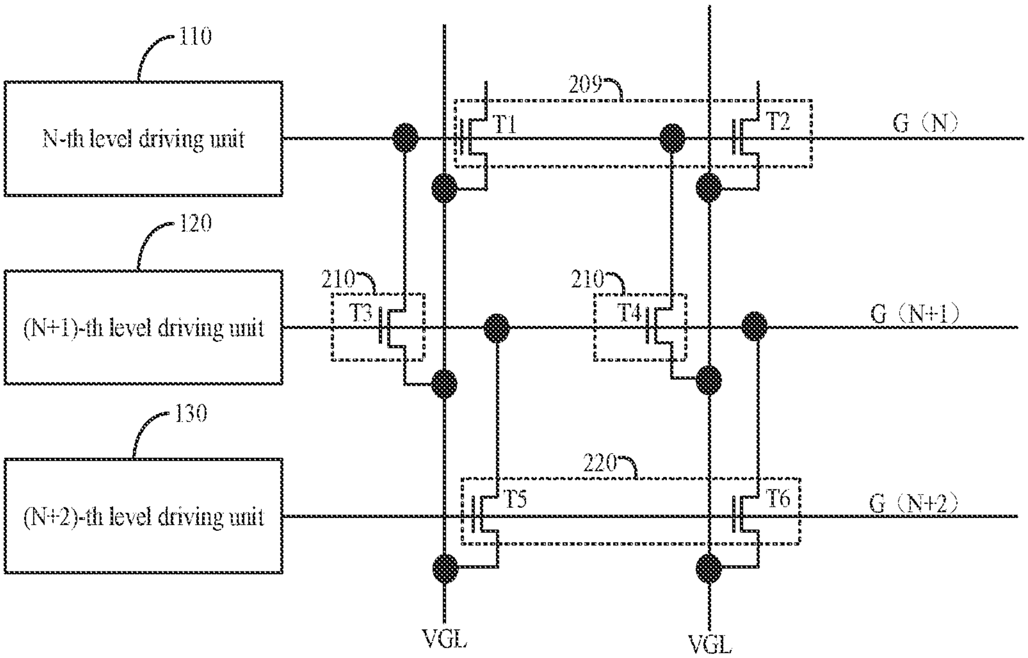
FIG. 5 is a fifth structural diagram illustrating the display panel according to one embodiment of the present application.

As shown in FIG. 5, in one embodiment, a driving module 100 can comprise an N-th level driving unit 110, an (N+1)-th level driving unit 120, and an (N+2)-th level driving unit 130. The N-th level driving unit 110 is configured to output an N-th level driving signal G (N), and an output end of the N-th level driving unit 110 is connected to an N-th driving line. The (N+1)-th level driving unit 120 is configured to output an (N+1)-th level driving signal G (N+1), an output end of the (N+1)-th level driving unit 120 is connected to an (N+1)-th driving line. The (N+2)-th level driving unit 130 is configured to output an (N+2)-th level driving signal G (N+2). An output end of the (N+2)-th level driving unit 130 is connected to an (N+2)-th driving line.

An output end of an (N−1)-th auxiliary unit 209 is electrically connected to an (N−1)-th driving line. An output end of the N-th auxiliary unit 210 is electrically connected to the N-th driving line. An output end of an (N+1)-th auxiliary unit 220 is electrically connected to the (N+1)-th driving line.

A control end of the (N−1)-th auxiliary unit 209 is connected to the N-th driving line. A falling edge of the (N−1)-th level driving signal is at a same time as a rising edge of the N-th level driving signal G (N); or alternatively, the rising edge of the N-th level driving signal G (N) lags behind the falling edge of the (N−1)-th level driving signal. A control end of the N-th auxiliary unit 210 is connected to the (N+1)-th driving line. A falling edge of the N-th level driving signal G (N) is at a same time as a rising edge of the (N+1)-th level driving signal G (N+1); or alternatively, the rising edge of the (N+1)-th level driving signal G (N+1) lags behind the falling edge of the N-th level driving signal G (N). A control end of the (N+1)-th auxiliary unit 220 is connected to the (N+2)-th driving line. A falling edge of the (N+1)-th level driving signal G (N+1) is at a same time as a rising edge of the (N+2)-th level driving signal G (N+2); or alternatively, the rising edge of the (N+2)-th level driving signal G (N+2) lags behind the falling edge of the (N+1)-th level driving signal G (N+1).

In the present embodiment, a first line DDL can be a constant low-potential line VGL, and the constant low-potential line VGL is configured to connect a constant low-potential signal. The constant low-potential line VGL is connected to an input end of the (N−1)-th auxiliary unit 209, an input end of the N-th auxiliary unit 210, and an input end of the (N+1)-th auxiliary unit 220.

The (N−1)-th auxiliary unit 209 can comprise a first transistor T1 and a second transistor T2. The constant low-potential line VGL is connected to one of a source or a drain of a first transistor T1 and one of a source or a drain of a second transistor T2. The N-th driving line is connected to a gate of the first transistor T1 and a gate of the second transistor T2. The (N−1)-th driving line is connected to the other one of the source or the drain of the first transistor T1 and the other one of the source or the drain of the second transistor T2.

The (N+1)-th auxiliary unit 220 can comprise a fifth transistor T5 and a sixth transistor T6. The constant low-potential line VGL is connected to one of a source or a drain of the fifth transistor T5 and one of a source or a drain of the sixth transistor T6. The (N+2)-th driving line is connected to a gate of the fifth transistor T5 and a gate of the sixth transistor T6. The (N+1)-th driving line is connected to the other one of the source or the drain of the fifth transistor T5 and the other one of the source or the drain of the sixth transistor T6.

It can be understood that, in the present embodiment, one auxiliary unit can comprise two transistors or multiple transistors, and the multiple transistors can be three transistors, four transistors, five transistors, or six transistors. The two transistors or multiple transistors can be thin film transistors (TFTs) to facilitate manufacturing of a display area AA on an array substrate. The TFTs can be, but are not limited to, N-channel TFTs, and can also be P-channel TFTs.

As shown in FIG. 5, in one embodiment, the auxiliary module 200 can comprise one or multiple N-th auxiliary units 210. The multiple N-th auxiliary units 210 can be two N-th auxiliary units 210, three N-th auxiliary units 210, four N-th auxiliary units 210, or five N-th auxiliary units 210. Each of the N-th auxiliary units 210 can comprise one or more thin film transistors. For example, when the N-th auxiliary units 210 are two N-th auxiliary units 210, one of the N-th auxiliary units 210 can comprise a third transistor T3, and the other one of the N-th auxiliary units 210 can comprise a fourth Transistor T4. The constant low-potential line VGL is connected to one of a source or a drain of the third transistor T3 and one of a source or a drain of the fourth transistor T4. An (N+1)-th driving line is connected to a gate of the third transistor T3 and a gate of the fourth transistor T4. The N-th driving line is connected to the other one of the source or the drain of the third transistor T3 and the other one of the source or the drain of the fourth transistor T4.

In one embodiment, the first line DDL can be at least one of the (N+1)-th driving line and the (N+2)-th driving line. When the control end of the N-th auxiliary unit 210 is connected to the (N+1)-th driving line, the input end of the N-th auxiliary unit 210 is connected to the (N+2)-th driving line; or alternatively, when the control end of the N-th auxiliary unit 210 is connected to the (N+2)-th driving line, the input end of the N-th auxiliary unit 210 is connected to the (N+1)-th driving line.

In one embodiment, the N-th auxiliary unit 210 comprises at least one thin film transistor (TFT); one of the source or the drain of the at least one TFT is connected to the N-th driving line.

In one embodiment, the gate of the at least one TFT is connected to the (N+1)-th driving line or the (N+2)-th driving line.

In one embodiment, the display panel further comprises at least one first line DDL. The at least one first line DDL is connected to the other one of the source or the drain of the at least one TFT. The first line DDL is configured to connect the constant low-potential signal.

In one embodiment, any one of the at least one first line DDL is at least partially located in the display area AA.

In one embodiment, the N-th auxiliary unit 210 comprises a first TFT and a second TFT. The N-th driving line is connected to one of the source or the drain of the first TFT to form a first connection node on the N-th driving line. The N-th driving line is connected to one of the source or the drain of the second TFT to form a second connection node on the N-th driving line. At least two of a distance from one end of the N-th driving line to the first connection node, a distance from the first connection node to the second connection node, and a distance from the second connection node to the other end of the N-th driving line are equal or approximately equal.

It should be noted that all TFTs in the same and/or different N-th auxiliary units 210 have different connection nodes formed on the N-th driving line. A distance between two adjacent connection nodes can be equal or approximately equal. At the same time, a distance between one end of the N-th driving line and the adjacent connection node can also be equal to or approximately equal to the distance between two adjacent connection nodes, and a distance between another end of the N-th driving line and the adjacent connection node can also be equal to or approximately equal to the distance between two adjacent connection nodes.

It should be noted that the one end of the N-th driving line can be, but is not limited to, an output end of the N-th level driving unit, or can be a point of the N-th driving line at a junction of one of the non-display areas and the display area.

The another end of the N-th driving line can be a point of the N-th driving line at a junction of another non-display area and the display area.

It can be understood that, in this way, the falling edge of the N-th level driving signal can achieve falling at the same time at equidistant intervals, and the falling edge of the N-th level driving signal can achieve falling more quickly and evenly.

It can be understood that as a length or a width of the display panel increases, the corresponding driving line SL also increases, and the corresponding driving signal is also subject to increasingly greater capacitive reactance and/or impedance in the driving line SL. Then, a waveform of the driving signal also has corresponding delay. For example, a duration of the falling edge of the driving signal is extended from a certain moment to a certain period of time. Correspondingly, the falling edge also changes from a linear line to a curved line, thereby causing the falling edge of the driving signal cannot have sharp falling. Based on this, it is necessary to compare different falling edges to better understand technical improvements brought about by different embodiments of the present application.

Figure 6:
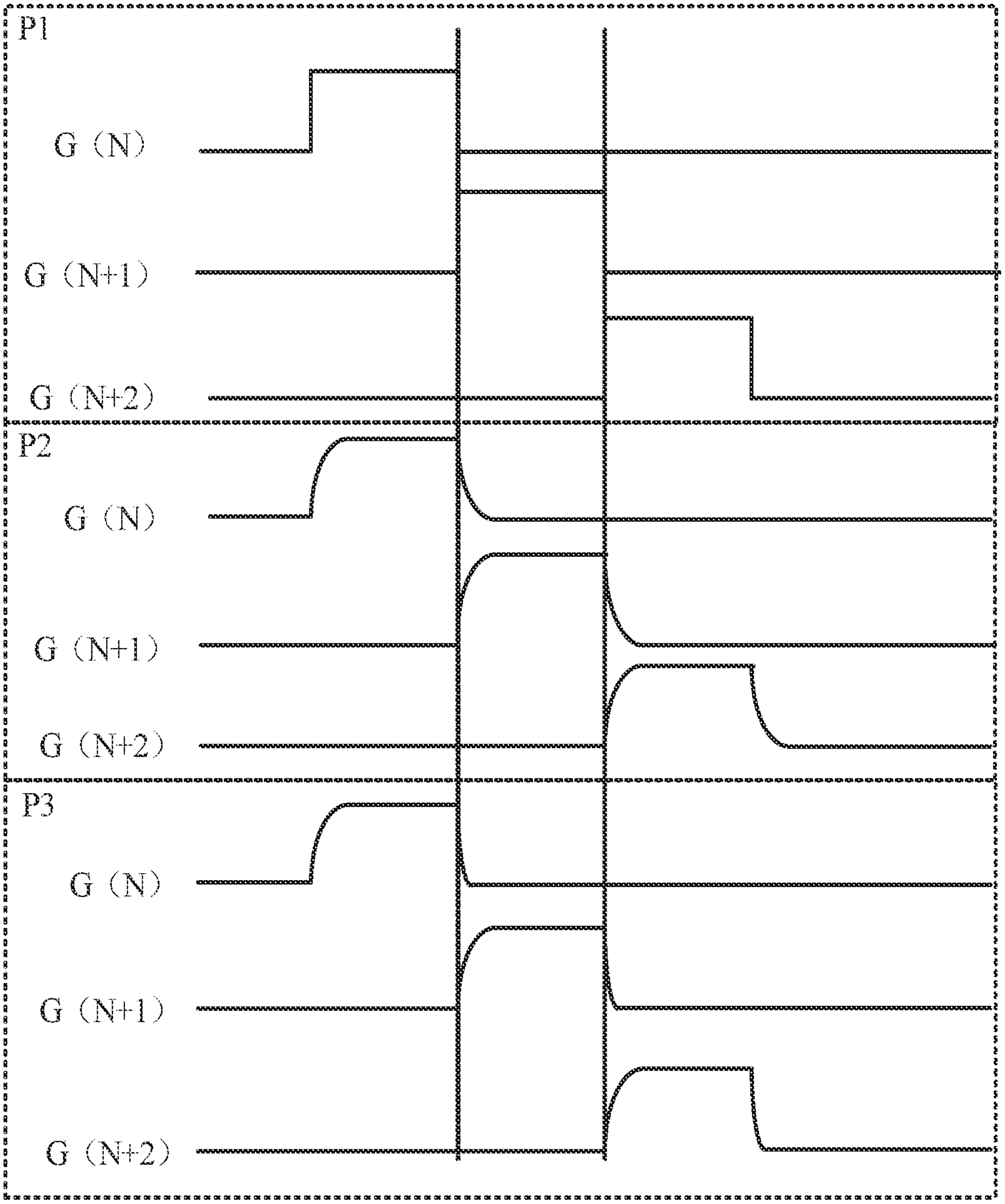
FIG. 6 is a schematic diagram illustrating a comparison between different driving signals according to one embodiment of the present application.

As shown in FIG. 6, FIG. 6 shows an ideal waveform diagram P1, a conventional waveform diagram P2, and an improved waveform diagram P3 of different embodiments of the present application. Each of the ideal waveform diagram P1, the conventional waveform diagram P2, and the improved waveform diagram P3 provides waveforms of the N-th level driving signal G (N), the (N+1)-th level driving signal G (N+1), and the (N+2)-th level driving signal G (N+2).

In the ideal waveform diagram P1, the rising edges or the falling edges of the N-th level driving signal G (N), the (N+1)-th level driving signal G (N+1), and the (N+2)-th level driving signal G (N+2) are all linear, or all have rising or falling at the same time. This type of waveform is an ideal waveform required by the display panel. However, due to influence of capacitive reactance and/or impedance, there is a certain amount of delay.

For example, a comparison between the conventional waveform diagram P2 and the improved waveform diagram P3 shows that the falling edges of the N-th level driving signal G (N), the (N+1)-th level driving signal G (N+1), and the (N+2)-th level driving signal G (N+2) in the conventional waveform diagram P2 take a longer falling time to reach a low potential than the falling edges of the corresponding N-th level driving signal G (N), the corresponding (N+1)-th level driving signal G (N+1), and the corresponding (N+2)-th level driving signal G (N+2) in the improved waveform diagram P3. In other words, the above embodiment can make the falling edge of the driving signal have sharp falling, which alleviates a delay problem caused by the driving signal influenced by the capacitive reactance and/or impedance in the display area AA.

It can be understood that although there may be a corresponding pull-down circuit in the corresponding driving unit, the driving unit with the corresponding pull-down circuit or even the driving module 100 cannot achieve the same technical function achieved by the above-mentioned embodiments because the driving unit with the corresponding pull-down circuit is located in the non-display area. Moreover, those skilled in the art generally assume that these driving modules 100 should be located in the non-display area. Therefore, normally, it is not easy for those skilled in the art to think that the auxiliary module 200 in the present embodiment can be arranged in the display area AA to achieve unexpected technical functions. Therefore, the inventive concept of the present application overcomes to some extent the technical prejudices which have been in the field for a long time, and can significantly increase a falling (pull-down) speed of the falling edge of the driving signal in the display area AA or a rising (pull-up) speed of the rising edge of the driving signal in the display area AA.

Figure 7:
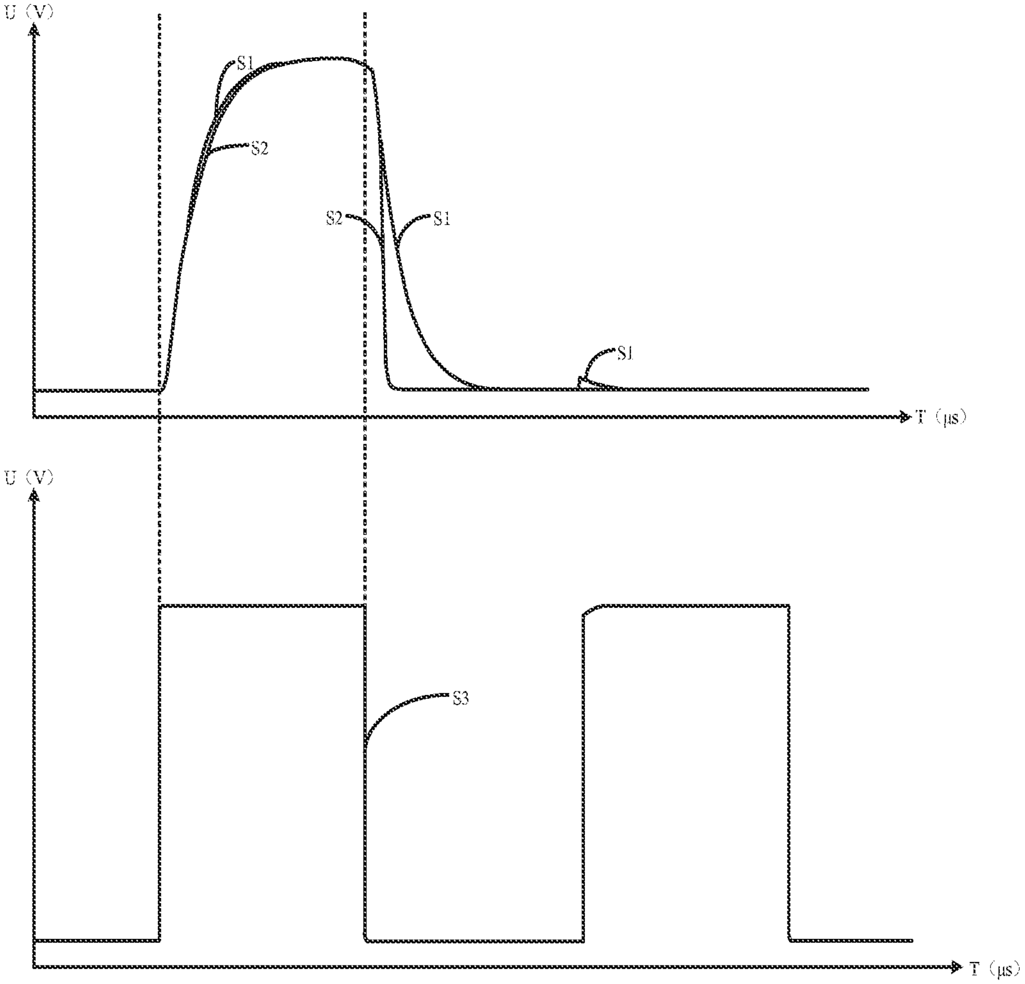
FIG. 7 is another schematic diagram illustrating a comparison between different driving signals according to one embodiment of the present application.

As shown in FIG. 7, the present application provides another schematic diagram illustrating a waveform comparison between the driving signals. A driving signal S1 is a driving signal in a conventional technical solution, a driving signal S2 is the driving signal in the above-mentioned embodiment, and a driving signal S3 is a driving signal in an ideal state. A horizontal axis represents time T, and an unit of the time T can be microseconds (μs). A vertical axis represents a voltage value U, and a unit of the voltage value U can be volts (V).

A rising speed of a rising edge of the driving signal S3 is significantly greater than a rising speed of a rising edge of the driving signal S1 and a rising speed of a rising edge of the driving signal S2. The rising speed of the rising edge of the driving signal S1 is approximate to or similar to the rising speed of the rising edge of the driving signal S2. A falling speed of a falling edge of the driving signal S3 is significantly greater than a falling speed of a falling edge of the driving signal S1 and a falling speed of a falling edge of the driving signal S2. The falling speed of the falling edge of the driving signal S1 is significantly less than the falling speed of the falling edge of the driving signal S2. At the same time, in some possible cases, a low potential state of the driving signal S1 is not influenced by a continuous pull-down action of the auxiliary module 200, so the low potential state is prone to be slightly higher to some degree, which further deteriorates a waveform of the driving signal S1, and in turn affects performance stability of the display panel.

One embodiment of the present application provides a display device, comprising the display panel in any of the above embodiments.

It can be understood that, in the display device of the present embodiment, the auxiliary module located in the display area is connected to the corresponding driving line, so that the falling edge of the driving signal transmitted in the driving line can have sharp falling (be pulled down quickly), which can alleviate the driving signal distortion problem in the non-display area when the driving module transmits the driving signal to the display area.

It should be noted that the display device can further comprise a pixel circuit. The pixel circuit is located in the display area of the display device, and the pixel circuit is electrically connected to the driving module through the driving line.

It can be understood that, equivalent replacements or changes can be made by those of ordinary skill in the art according to the technical solution of the present application and its inventive concept. All such changes or replacements shall fall within the protection scope of the appended claims of the present application.

What is claimed is:

1. A display panel, comprising:

a first line;

an N-th scan line, wherein at least a portion of the N-th scan line is arranged in a display area of the display panel, and is configured to transmit an N-th level scan signal, wherein N is a positive integer; and an N-th auxiliary unit, wherein the N-th auxiliary unit is arranged in the display area of the display panel, an output end of the N-th auxiliary unit is electrically connected to the N-th scan line, an input end of the N-th auxiliary unit is electrically connected to the first line, a control end of the N-th auxiliary unit is electrically connected to an (N+M)-th scan line, and M is a positive integer, wherein the N-th auxiliary unit comprises a plurality of thin film transistors (TFTs), one of a source and a drain of at least one of the TFTs is electrically connected to the N-th scan line, the other one of the source and the drain of the at least one TFT is electrically connected to the first line, and a gate of the at least one TFT is electrically connected to the (N+M)-th scan line, wherein the TFTs are N-channel TFTs, and the first line is configured to transmit a constant low-potential signal, wherein the control end of the N-th auxiliary unit is electrically connected to an (N+1)-th scan line, the first line is an (N+X)-th scan line, and X is an integer greater than or equal to 2.

2. The display panel according to claim 1, wherein the N-th scan line is electrically connected to one of the source and the drain of each TFT to form a plurality of corresponding connection nodes on the N-th scan line;

the N-th level scan signal is input from at least one end of the N-th scan line; and if the N-th level scan signal is input from one end of the N-th scan line, a density of the connection nodes close to another end of the N-th scan line is greater than a density of the connection nodes close to the one end of the N-th scan line from which the N-th level scan signal is input.

3. The display panel according to claim 2, wherein if the N-th level scan signal is input from two ends of the N-th scan line, a density of the connection nodes in a middle of the N-th scan line is greater than a density of the connection nodes close to any end of the N-th scan line.

4. The display panel according to claim 1, wherein the TFTs are P-channel TFTs, and the first line is configured to transmit a constant high-potential signal.

5. The display panel according to claim 4, wherein the control end of the N-th auxiliary unit is electrically connected to an (N+1)-th scan line, the first line is an (N+X)-th scan line, and X is an integer greater than or equal to 2.

6. A display device, comprising a display panel, the display panel comprising:

a first line;

an N-th scan line, wherein at least a portion of the N-th scan line is arranged in a display area of the display panel, and is configured to transmit an N-th level scan signal, wherein N is a positive integer; and an N-th auxiliary unit, wherein the N-th auxiliary unit is arranged in the display area of the display panel, an output end of the N-th auxiliary unit is electrically connected to the N-th scan line, an input end of the N-th auxiliary unit is electrically connected to the first line, a control end of the N-th auxiliary unit is electrically connected to an (N+M)-th scan line, and M is a positive integer, wherein the N-th auxiliary unit comprises a plurality of thin film transistors (TFTs), one of a source and a drain of at least one of the TFTs is electrically connected to the N-th scan line, the other one of the source and the drain of the at least one TFT is electrically connected to the first line, and a gate of the at least one TFT is electrically connected to the (N+M)-th scan line, wherein the TFTs are N-channel TFTs, and the first line is configured to transmit a constant low-potential signal, wherein the control end of the N-th auxiliary unit is electrically connected to an (N+1)-th scan line, the first line is an (N+X)-th scan line, and X is an integer greater than or equal to 2.

7. The display device according to claim 6, wherein the N-th scan line is electrically connected to one of the source and the drain of each TFT to form a plurality of corresponding connection nodes on the N-th scan line;

the N-th level scan signal is input from at least one end of the N-th scan line; and if the N-th level scan signal is input from one end of the N-th scan line, a density of the connection nodes close to another end of the N-th scan line is greater than a density of the connection nodes close to the one end of the N-th scan line from which the N-th level scan signal is input.

8. The display device according to claim 7, wherein if the N-th level scan signal is input from two ends of the N-th scan line, a density of the connection nodes in a middle of the N-th scan line is greater than a density of the connection nodes close to any end of the N-th scan line.

9. The display device according to claim 6, wherein the TFTs are P-channel TFTs, and the first line is configured to transmit a constant high-potential signal.

10. The display device according to claim 9, wherein the control end of the N-th auxiliary unit is electrically connected to an (N+1)-th scan line, the first line is an (N+X)-th scan line, and X is an integer greater than or equal to 2.

* * * * *